(12) United States Patent
Jeong et al.

(10) Patent No.: US 10,511,804 B2
(45) Date of Patent: *Dec. 17, 2019

(54) DISPLAY APPARATUS AND CONTROL METHODS THEREOF

(71) Applicant: SAMSUNG ELECTRONICS CO., LTD., Suwon-si (KR)

(72) Inventors: Seong-wook Jeong, Seoul (KR); Sung-hye Lee, Seoul (KR); Sung-hyun Jang, Seoul (KR); Kwan-min Lee, Seoul (KR); Sang-hee Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,127

(22) Filed: Jul. 6, 2018

(65) Prior Publication Data

US 2018/0316892 A1 Nov. 1, 2018

Related U.S. Application Data

(63) Continuation of application No. 15/394,026, filed on Dec. 29, 2016, now Pat. No. 10,044,977.

(30) Foreign Application Priority Data

Jan. 6, 2016 (KR) .......................... 10-2016-0001629

(51) Int. Cl.
*H04N 7/14* (2006.01)
*H04N 5/445* (2011.01)
(Continued)

(52) U.S. Cl.
CPC ............ *H04N 7/147* (2013.01); *G06F 3/017* (2013.01); *G06F 3/167* (2013.01);
(Continued)

(58) Field of Classification Search
USPC .......................................... 348/14.01, 14.08
See application file for complete search history.

(56) References Cited

U.S. PATENT DOCUMENTS 10,044,977 B2 * 8/2018 Jeong ..................... H04N 7/147
2008/0003985 A1 1/2008 Jung et al.
(Continued)

FOREIGN PATENT DOCUMENTS

EP 2357818 A2 8/2011
JP 2005-94696 A 4/2005
(Continued)

OTHER PUBLICATIONS

Communication dated May 9, 2018, issued by the European Patent Office in counterpart European Patent Application No. 16884047.8.
(Continued)

*Primary Examiner* — Quoc D Tran
(74) *Attorney, Agent, or Firm* — Sughrue Mion, PLLC

(57) ABSTRACT

A display apparatus includes a communication interface configured to communicate with another display apparatus, a display configured to display contents being shared with the other display apparatus and a video call user interface (UI) for a video call with a user of the other display apparatus, and a processor, in response to at least one of a gesture and a voice of the user included in video call data received from the other display apparatus satisfying a predetermined condition, configured to control the display to change a size of the video call UI displayed on the display.

20 Claims, 14 Drawing Sheets

(51) Int. Cl.
  *G06F 3/01* (2006.01)
  *G06F 3/16* (2006.01)
  *H04N 21/422* (2011.01)
  *H04N 21/4223* (2011.01)
  *H04N 21/431* (2011.01)
  *H04N 21/439* (2011.01)
  *H04N 21/44* (2011.01)
  *H04N 21/4788* (2011.01)

(52) U.S. Cl.
  CPC ..... *H04N 5/44504* (2013.01); *H04N 5/44513* (2013.01); *H04N 5/44591* (2013.01); *H04N 21/4223* (2013.01); *H04N 21/42203* (2013.01); *H04N 21/4316* (2013.01); *H04N 21/4394* (2013.01); *H04N 21/44008* (2013.01); *H04N 21/4788* (2013.01)

(56) References Cited

U.S. PATENT DOCUMENTS

| | | |
|---|---|---|
| 2009/0029694 A1 | 1/2009 | Kano et al. |
| 2011/0181683 A1 | 7/2011 | Nam |
| 2011/0279637 A1 | 11/2011 | Periyannan et al. |
| 2013/0198795 A1 | 8/2013 | Eleftheriadis et al. |
| 2013/0205408 A1 | 8/2013 | Yerli |
| 2014/0184723 A1* | 7/2014 | Morrison ............... H04N 7/147 348/14.07 |
| 2014/0253669 A1 | 9/2014 | Kim et al. |
| 2014/0333713 A1* | 11/2014 | Shoemake .......... H04L 65/1069 348/14.05 |
| 2014/0359651 A1 | 12/2014 | Lee et al. |
| 2015/0015690 A1* | 1/2015 | Roh ................... H04N 5/23219 348/77 |
| 2015/0138302 A1 | 5/2015 | Sethi et al. |
| 2015/0206351 A1 | 7/2015 | Abercrombie et al. |
| 2015/0326822 A1 | 11/2015 | Jeong et al. |

FOREIGN PATENT DOCUMENTS

| | | |
|---|---|---|
| JP | 2005-328484 A | 11/2005 |
| JP | 2009-33255 A | 2/2009 |
| KR | 10-2010-0062559 A | 6/2010 |
| KR | 10-2011-0087025 A | 8/2011 |
| KR | 10-2011-0090001 A | 8/2011 |
| KR | 10-2011-0112686 A | 10/2011 |
| KR | 10-1274471 B1 | 6/2013 |

OTHER PUBLICATIONS

International Search Report dated Apr. 3, 2017 issued by the International Searching Authority in Counterpart International Application No. PCT/KR2016/015386 (PCT/ISA/210).

Written Opinion dated Apr. 3, 2017 issued by the International Searching Authority in Counterpart International Application No. PCT/KR2016/015386 (PCT/ISA/237).

Communication dated Jan. 31, 2019 issued by the European Patent Office in counterpart European Patent Application No. 16884047.8.

Communication dated Aug. 13, 2019, issued by the European Patent Office in counterpart European Application No. 16884047.8.

* cited by examiner

DISPLAY APPARATUS AND CONTROL METHODS THEREOF

CROSS-REFERENCE TO RELATED APPLICATION

This application is a continuation of U.S. application Ser. No. 15/394,026, filed Dec. 29, 2016, which claims priority from Korean Patent Application No. 10-2016-0001629, filed in the Korean Intellectual Property Office on Jan. 6, 2016, the contents of which are incorporated herein by reference in their entireties.

BACKGROUND

1. Field

Apparatuses and methods consistent with exemplary embodiments relate to a display apparatus and a control method thereof, and more particularly, to a display apparatus which performs a video call with another display apparatus and a control method thereof.

2. Description of the Related Art

Due to development of electronic technology, various types of electronic devices are widely used in various fields. Particularly, a display device that may share contents with another display device on a real time basis and perform a video call at the same time has been developed.

However, due to restriction in a display area, when a video call user interface (UI) is displayed to be large, it may prevent a user's watching contents. On the other hand, if a video call UI is displayed to be small, meaning of video call is discolored.

Accordingly, there is a use for detecting utilization of video call function and changing a video call UI flexibly while not hindering watching of contents.

SUMMARY

One or more exemplary embodiments provide an apparatus which change a size of a video call UI according to a behavior of a counterpart of a video call and a control method thereof.

According to an aspect of an exemplary embodiment, there is provided a display apparatus including a communication interface configured to communicate with another display apparatus; a display configured to display contents that are shared with the other display apparatus, together with a video call user interface (UI) for a video call with a user of the other display apparatus; and a processor configured to, in response to determining that at least one from among a gesture of the user and a voice of the user included in video call data received from the other display apparatus satisfies a predetermined condition, control the display to change a size of the video call UI displayed on the display.

The processor may be further configured to, in response to the at least one from among the gesture and the voice of the user included in the video call data received from the other display apparatus being recognized for longer than a predetermined time, gradually enlarge the size of the video call UI displayed on the display.

The processor may be further configured to, in response to a level of the voice of the user included in the video call data received from the other display apparatus being greater than a predetermined amount, enlarge the size of the video call UI to a predetermined size displayed on the display.

The processor may be further configured to, in response to the level of the voice of the user being greater than a volume of the contents, enlarge the video call UI displayed on the display to the predetermined size.

The processor may be further configured to, in response to the voice of the user not being recognized for a predetermined time while the video call UI displayed on the display is enlarged to the predetermined size, return the video call UI displayed on the display to a size prior to being enlarged.

The processor may be further configured to, in response to the at least one from among the gesture and the voice of the user being recognized from voice call data received from the other display apparatus, control the display to provide a predetermined visual feedback at an edge of the video call UI displayed on the display, and in response to the at least one from among the recognized gesture and the recognized voice of the user satisfying a predetermined condition, change the size of the video call UI displayed on the display.

The processor may be further configured to, in response to the gesture and the voice of the user of the other display apparatus not being recognized from video call data received from the other display apparatus, replace the video call data displayed in the video call UI with a predetermined image.

The processor may be further configured to, in response to the at least one from among the gesture and the voice of the user included in video call data received from the other display apparatus not being recognized for longer than a predetermined time, gradually reduce the size of the video call UI displayed on the display.

The processor may be further configured to receive privacy level information of the user of the other display apparatus from the other display apparatus, and change the size of the video call UI displayed on the display based on the received privacy level information.

The processor may be further configured to: in response to at least one from among the gesture and the voice of the user satisfying a predetermined condition, determine a privacy level of the user of the other display apparatus from the privacy level information; and if the privacy level of the user is less than a predetermined level, change the size of the video call UI displayed on the display, and if the privacy level is greater than or equal to the predetermined level, maintain the size of the video call UI displayed on the display.

According to an aspect of another exemplary embodiment, there is provided a control method of a display apparatus, the control method including: displaying contents that are shared with another display apparatus, together with a video call user interface (UI) for a video call with a user of the other display apparatus; and in response to determining that at least one from among a gesture and a voice of the user included in video call data received from the other display apparatus satisfies a predetermined condition, changing a size of the video call UI displayed on a display.

The changing the size of the video call UI displayed on the display may include, in response to the at least one from among the gesture and the voice of the user included in the video call data received from the other display apparatus being recognized for longer than a predetermined time, gradually enlarging the size of the video call UI displayed on the display.

The changing the size of the video call UI displayed on the display may include, in response to a level of the voice of the user included in the video call data received from the other display apparatus being greater than a predetermined size, enlarging the size of the video call UI displayed on the display to a predetermined size.

The changing the size of the video call UI displayed on the display may include, in response to the level of the user voice being greater than a volume of the contents, enlarging the video call UI displayed on the display to the predetermined size.

The changing the size of the video call UI on the display may include, in response to the voice of the user not being recognized for a predetermined time while the video call UI is enlarged to the predetermined size, returning the video call UI displayed on the display to a size prior to being enlarged.

The changing the size of the video call UI displayed on the display may include, in response to the at least one from among the gesture and the voice of the user being recognized from video call data received from the other display apparatus, providing a predetermined visual feedback at an edge of the video call UI, and in response to the at least one from among the recognized gesture and the recognized voice of the user satisfying a predetermined condition, changing a size of the video call UI displayed on the display.

The changing the size of the video call UI displayed on the display may include, in response to the gesture and the voice of the user not being recognized from video call data received from the other display apparatus, replacing the video call data displayed in the video call UI with a predetermined image.

The changing the size of the video call UI displayed on the display may include, in response to the at least one from among the gesture and the voice of the user included in video call data received from the other display apparatus not being recognized for longer than a predetermined time, gradually reducing the size of the video call UI displayed on the display.

The changing the size of the video call UI on the display may include receiving, from the other display apparatus, privacy level information of the user of the other display apparatus, changing the size of the video call UI displayed on the display based on the received privacy level information.

The changing the size of the video call UI on the display may include, in response to at least one from among the gesture and the voice of the user satisfying a predetermined condition, when privacy level of the user is less than a predetermined level, changing the size of the displayed video call UI, and when privacy level is greater than or equal to the predetermined level, maintaining the size of the video call UI displayed on the display.

According to an aspect of another exemplary embodiment, there is provided an apparatus including: a communication interface configured to communicate with another apparatus; a processor configured to: control a display to display contents that are shared with the other apparatus, together with a video call user interface (UI) for a video call with a user of the other apparatus; and in response to determining that at least one from among a gesture of the user and a voice of the user of the other apparatus satisfies a predetermined condition, control the display to change a size of the displayed video call UI.

The processor may be further configured to, in response to the at least one from among the gesture and the voice of the user of the other apparatus being recognized for longer than a predetermined time, gradually enlarge the size of the displayed video call UI.

The processor may be further configured to, in response to a volume level of the voice of the user of the other apparatus being greater than a predetermined amount, enlarge the size of the displayed video call UI to a predetermined size.

The processor may be further configured to, in response to the at least one from among the gesture and the voice of the user being recognized from voice call data received from the other apparatus, control the display to provide a predetermined visual feedback at an edge of the displayed video call UI, and in response to the at least one from among the recognized gesture and the recognized voice of the user satisfying a predetermined condition, change the size of the displayed video call UI.

The processor may be further configured to receive privacy level information of the user of the other apparatus, and change the size of displayed the video call UI based on the received privacy level information.

According to one or more exemplary embodiments, a display device may change a size of a video call UI according to a behavior a user at the other end of a video call and attract attentions of a user of a video call.

BRIEF DESCRIPTION OF THE DRAWINGS

The above and/or other aspects and features will be more apparent from the following description when taken in conjunction with the accompanying drawings, in which.

DETAILED DESCRIPTION

Figure 1:
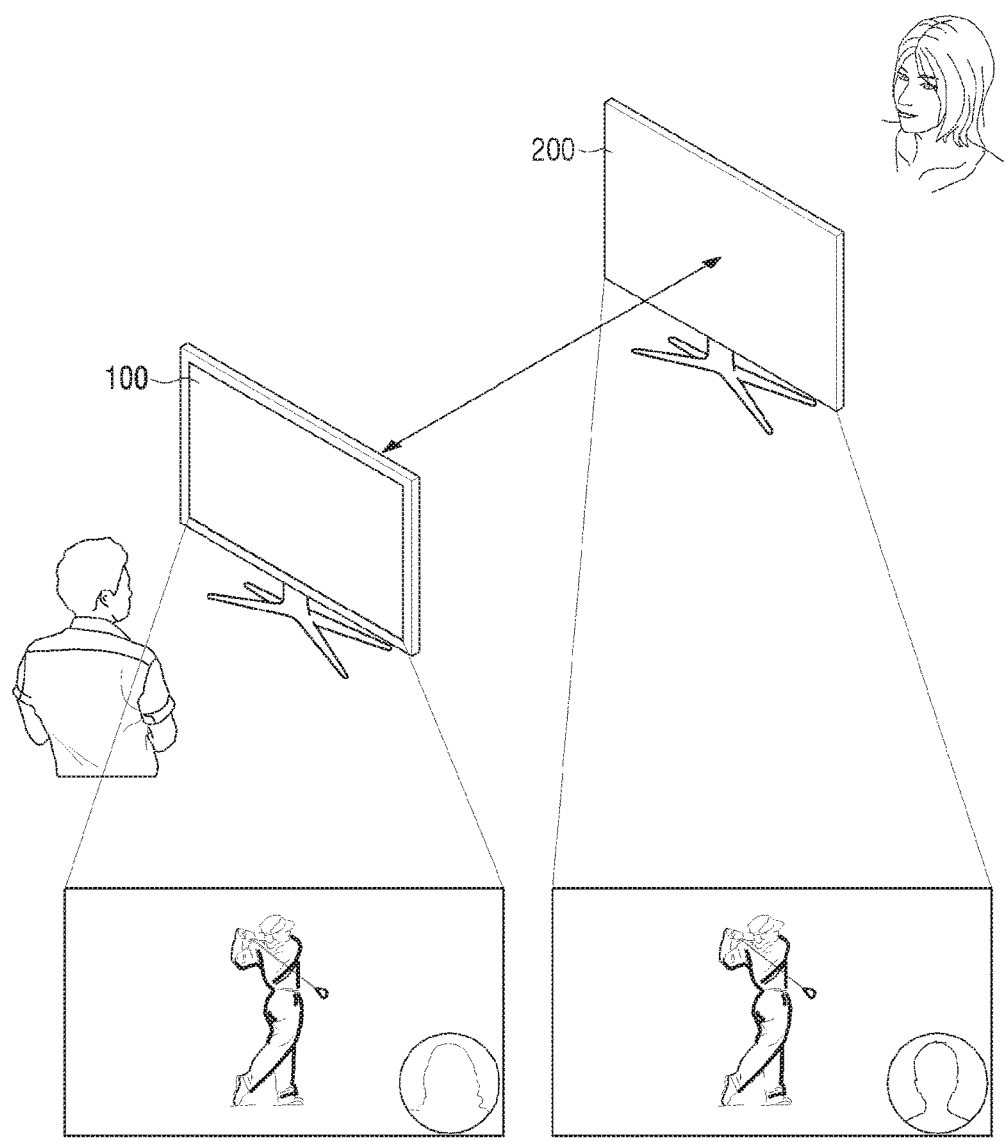
FIG. 1 is a diagram illustrating a video call system, according to an exemplary embodiment.

Exemplary embodiments are described below in detail with reference to the accompanying drawings. The same or similar components may be designated by the same or similar reference numerals, although they are illustrated in different drawings. Detailed descriptions of constructions or processes known in the art may be omitted to avoid obscuring the subject matter of the present disclosure.

Relational terms such as first and second, and the like, may be used to distinguish one entity from another, without necessarily implying any actual relationship or order between such entities.

The terms used herein are provided to describe exemplary embodiments and are not intended to limit the scope of the present disclosure. A singular term includes a plural form unless clearly defined otherwise. The terms "include" and "configured to", as used herein, are used to indicate that there are features, numbers, steps, operations, elements, parts or a combination thereof, and these terms should not exclude the possibility of a combination or an addition of one or more features, numbers, steps, operations, elements, parts, or a combination thereof.

As described herein, a module or a unit may perform at least one function or operation, and may be realized as hardware, software, or a combination thereof. In addition, a plurality of modules or units may be integrated into at least one module and may be realized as at least one process, except for modules or units that should be realized in hardware. When one element is referred to as being "connected to" another element, the elements may be directly connected or a third element may be connected in between. When an element is referred to as being "directly connected to" another element, the elements are directly connected without a third element connected in between.

Herein, the expression "configured to" can be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device can perform an operation along with another device or part. For example, the expression "a processor configured to perform A, B, and C" may indicate an exclusive processor (e.g., an embedded processor) to perform the corresponding operation, or a generic-purpose processor (e.g., a central processing unit (CPU) or application processor (AP)) that can perform the corresponding operations by executing one or more software programs stored in the memory device.

Technical terms used herein are to be used for the purpose of describing exemplary embodiments, and are not intended to limit the scope. In addition, the technical terms used herein are to be interpreted as is understood in the present disclosure by those of ordinary skill in the art, unless they are specifically defined by other means. Further, when technical terms do not accurately represent the features of the present disclosure, they may be replaced with meanings determined by one of ordinary skill in the art. In addition, the terms used herein, which are defined as provided in advance, or which are to be interpreted according to the context before and after, are not to be construed as having a meaning in an excessively reduced manner.

Expressions such as "at least one of," when preceding a list of elements, modify the entire list of elements and do not modify the individual elements of the list.

Below, one or more exemplary embodiments will be described in greater detail with reference to the drawings.

FIG. 1 illustrates a video call system 1000 according to an exemplary embodiment. As illustrated in FIG. 1, the video call system 1000 includes a display apparatus 100 and a different display apparatus 200.

The display apparatus 100 can be embodied as various types of devices having display functions such as a monitor, TV, and kiosk. The display apparatus 100 may be embodied as a stationary type apparatus.

The display apparatus 100 may communicate with the different display apparatus 200. The display apparatus 100 may transmit and receive video data and audio data to perform a video call with the different display apparatus 200. Video data may be video data captured by the different display apparatus 200, and audio data may be audio data input to the different display apparatus 200.

The display apparatus 100 may share contents, in addition to conducting a video call with the different display apparatus 200. For example, the display apparatus 100 may transmit movie content to the different display apparatus 200 and reproduce it on a real time basis.

To share contents, the display apparatus 100 may transmit contents to the different display apparatus 200. The display apparatus 100 may receive contents to share from the different display apparatus 200. The display apparatus 100 and the different display apparatus 200 may receive the same contents from a server, etc., and display the contents on a real-time basis.

The display apparatus 100, while displaying contents which are being shared with the different display apparatus 200 on a real-time basis, may conduct a video call. In this case, the display apparatus 100 may display a video call UI on one side of a display area.

In particular, the display apparatus 100, when at least one of a user gesture and a voice included in the video call data received from the different display apparatus 200 satisfies a preset condition (e.g., predetermined condition), may change a size of a video call UI and display the UI.

For example, when an operation such as shaking arms of a user of the different display apparatus 200 is sensed, the display apparatus 100 may magnify size of the video call UI and display it.

The different display apparatus 200 may be embodied as various types of apparatuses having display function such as a monitor, TV, and kiosk. In particular, the different display apparatus 200 may be an apparatus which is the same as the display apparatus 100, and perform the same function as the display apparatus 100 and thus, detailed description will be omitted.

Figure 2A:
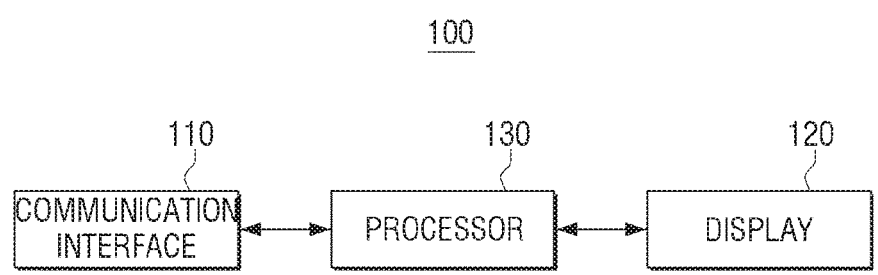
FIGS. 2A and 2B are diagrams illustrating a configuration of a display apparatus, according to an exemplary embodiment.
Figure 2B:
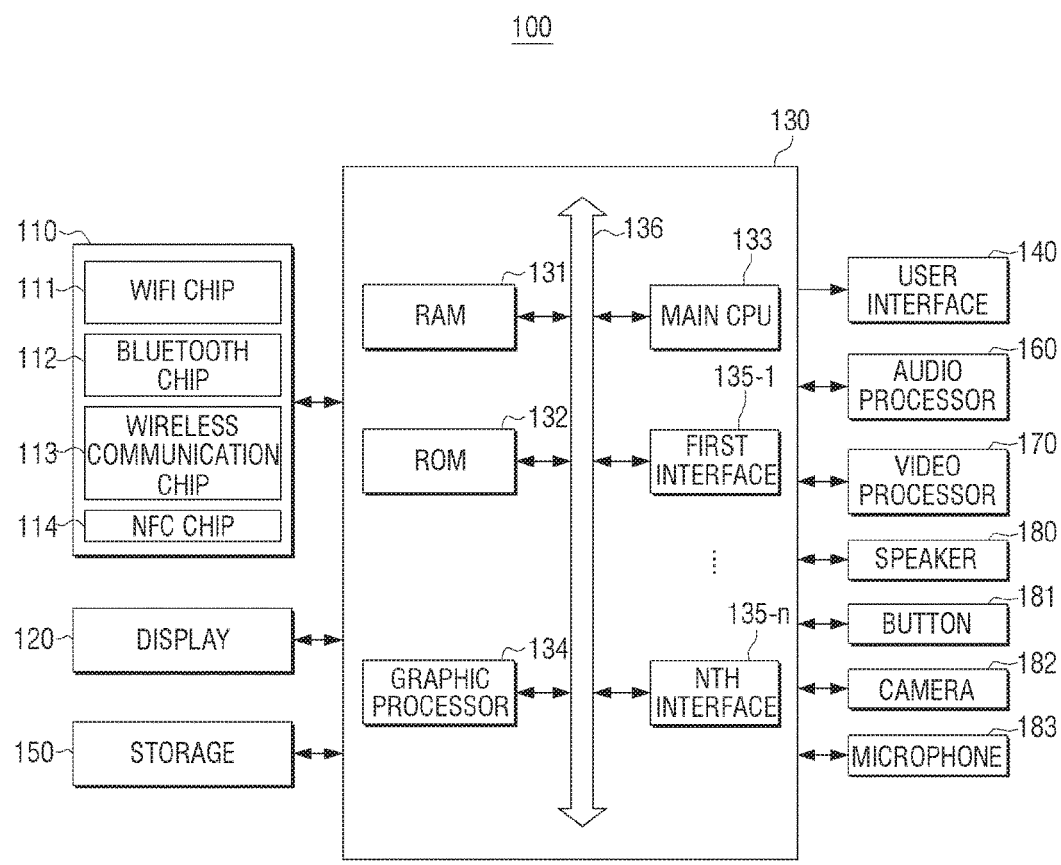

FIGS. 2A and 2B are block diagrams illustrating features of the display apparatus 100 according to an exemplary embodiment.

As illustrated in FIG. 2A, a display apparatus 100 includes a communication interface 110, a display 120, and a processor 130.

The communication interface 110 may communicate with the different display apparatus 200. The communication interface 110 may transmit and receive contents which are being shared with the different display apparatus 200 on a real-time basis, and transmit and receive data relating to video call.

The communication interface 110 may perform unidirectional or bidirectional communication with the different display apparatus 200. The communication interface 110 may perform unidirectional communication to transmit, to the different display apparatus 200, the shared contents on a real time basis, or receive, from the different display apparatus 200, the content. The communication interface 110 may perform bidirectional communication while transceiving video call data with the different display apparatus 200.

The display 120 may display contents being shared on a real time basis with the different display apparatus 200 by control of the processor 130 and video call UI with a user of the different display apparatus 200. For example, the display 120 may display the content being shared on a real-time basis on an entire display area and display a video call UI on an area of a display to be overlapped.

In addition, the display 120 may be embodied as a liquid crystal display (LCD) panel or an organic light emitting diode (OLED) display, but is not limited thereto. The display 120 can be embodied as a flexible display and a transparent display according to some cases.

The processor 130 controls overall operation of the display apparatus 100.

The processor 130, when at least one of gesture and voice included in video call data received from the different display apparatus 200 satisfies a preset condition, may control the display 120 to change a size of a video call UI and display the UI.

The processor 130, when at least one of gesture and voice of a user included in video call data received from the different display apparatus 200 is recognized for more than a preset time (e.g., predetermined time), may control to gradually magnify the video call UI and display it.

The processor 130, when user voice included in video call data received from the different display apparatus 200 is greater than or equal to a preset size (e.g., predetermined size), may control to magnify video call UI to a preset size and display the UI.

The processor 130, when a user voice is greater than or equal to contents volume, may control to magnify video call UI to a preset size and display the UI.

The processor 130, while the video call UI is magnified to a preset size, when a user voice is not recognized for a preset time, may control to return the magnified video call UI to a size immediately before being magnified and display the UI.

In addition, the processor 130, when at least one of gesture and voice of a user is recognized from video call data received from the different display apparatus 200, may control to provide preset visual feedback to an edge of the video call UI, and when at least one of the recognized user gesture and voice satisfies a preset condition, change size of the video call UI and display the UI.

In addition, the processor 130, when gesture and voice of a user is not recognized from video call data received from the different display apparatus 200, may control to replace video call data displayed on the video call UI to a preset image and display.

The processor 130, when at least one of a gesture and a voice included in video call data received from the different display apparatus 200 is not recognized for more than preset time, may control to gradually reduce video call UI and display the UI.

The processor 130 may control to receive from the different display apparatus 200 user privacy level information, and based on the received privacy level information, change size of the video call UI and display the UI.

Here, the processor 130, when at least one of a user gesture and a voice satisfies a preset condition, when privacy level of a user is less than preset level, may control to change size of video call UI and display the UI, and when the level is greater than or equal to preset level, control not to change size of the video call UI.

FIG. 2B is a block diagram illustrating an example of the display apparatus 100. Referring to FIG. 2B, the display apparatus 100 includes the communication interface 110, the display 120, the processor 130, a user interface 140, a storage 150, an audio processor 160, a video processor 170, a speaker 180, a button 181, a camera 182, and a microphone 183. The elements that are overlapped with the elements of FIG. 2A will not be further described.

The communication interface 110 may include a Wi-Fi Chip 111, a Bluetooth Chip 112, a wireless communication chip 113, and a near field communication (NFC) chip 114.

The processor 130 controls overall operations of the display apparatus 100 using various programs stored in the storage 150.

The processor 130 may include RAM 131, ROM 132, main CPU 133, graphic processor 134, first to nth interface 135-1~135-n, and bus 136.

The RAM 131, ROM 132, main CPU 133, graphic processor 134, the first to nth interface 135-1~135-n, etc. can be interconnected through the bus 136.

The first to nth interface 135-1 to 135-n are connected with aforementioned elements. One of the interfaces can be a network interface that is connected with an external device through network.

The main CPU 133, by accessing the storage 150, performs booting using O/S stored in the storage 150. Using various programs stored in the storage 150, various operations are performed.

The ROM 132 stores a command set for system booting therein. When a turn-on command is input and power is supplied, the main CPU 133 copies O/S stored in the storage 150 according to a command stored in the ROM 132 to the RAM 131, and booths system by executing the O/S. When booting is completed, the main CPU 133 copies various application programs stored in the storage 150 to the RAM 131, and executes various operations by executing an application program copied to the RAM 131.

The graphic processor 134, using a calculator and a renderer, generates a screen including various objects such as an icon, an image, and text. The calculator, based on the received control command, calculates attribute values such as a coordinate value where each object is to be displayed according to layout of a screen, shape, size, and color. The renderer generates a screen of various layouts including objects based on attribute values calculated from calculator. The screen generated from the renderer is displayed within a display area of the display 120.

The above-described operations of the processor 130 can be performed by a program stored in the storage 150.

The storage 150 stores various data such as an operation system (O/S) software module for operating the display apparatus 100, video data analysis module, audio data analysis module, video call module, and contents sharing module.

In this case, the processor 130, based on information stored in the storage 150, may display contents being shared on a real time basis with the different display apparatus 200 and video call UI.

A user interface 140 receives various user interactions. Here, the user interface 140 can be embodied as various types according to exemplary embodiments of the display apparatus 100. When the display apparatus 100 is embodied as a digital TV, the user interface 140 can be embodied as a remote controller receiving unit which receives a remote control signal from a remote control device, a camera which detects user motion, and a microphone which receives user voice. In addition, when the display apparatus 100 is embodied as a touch-based electronic apparatus, the user interface 140 may be embodied as a touch screen which has mutual layer structure with a touch pad. In this case, the user interface 140 may be used as the above-described display 120.

A touch sensor may be embodied as capacitive or resistive. The capacitive sensor indicates a sensor which calculates a touch coordinate by sensing electricity which is transferred to a human body, when a part of a user's body is touched with a surface of a display, using dialect coated on the display surface. Resistive touch sensor includes two electrode plates provided in the display apparatus 100, and when a user touches the surface, upper and lower plates of a touched point are in contact with each other, sensing flow of current. In addition, infrared light sensing method, surface ultrasonic wave transfer method, integral tension measurement method, piezo effect method can be used for sensing touch interaction.

The audio processor 160 is an element to process audio data. The audio processor 160 may perform various processing such as decoding, amplification, and noise filtering of audio data.

The video processor 170 is an element which performs video data processing. The video processor 170 may perform various image processing such as decoding, scaling, noise filtering of video data, frame rate conversion, and resolution conversion.

The speaker 180 is an element to output various alarm sounds or voice messages as well as various audio data processed by the audio processor 160.

The button 181 may be various types of buttons such as a mechanical button, touch pad, and wheel formed on a random area such as a front portion, side portion and rear portion of outer part of the main body of the display apparatus 100.

The camera 182 is an element to photograph a still image or a moving image according to control of a user. The camera 182 can be embodied as plural cameras such as a front camera and a rear camera.

The microphone 183 is an element to receive user voice and/or other sound and convert them to audio data.

Below, one or more exemplary embodiments are described.

Figure 3:
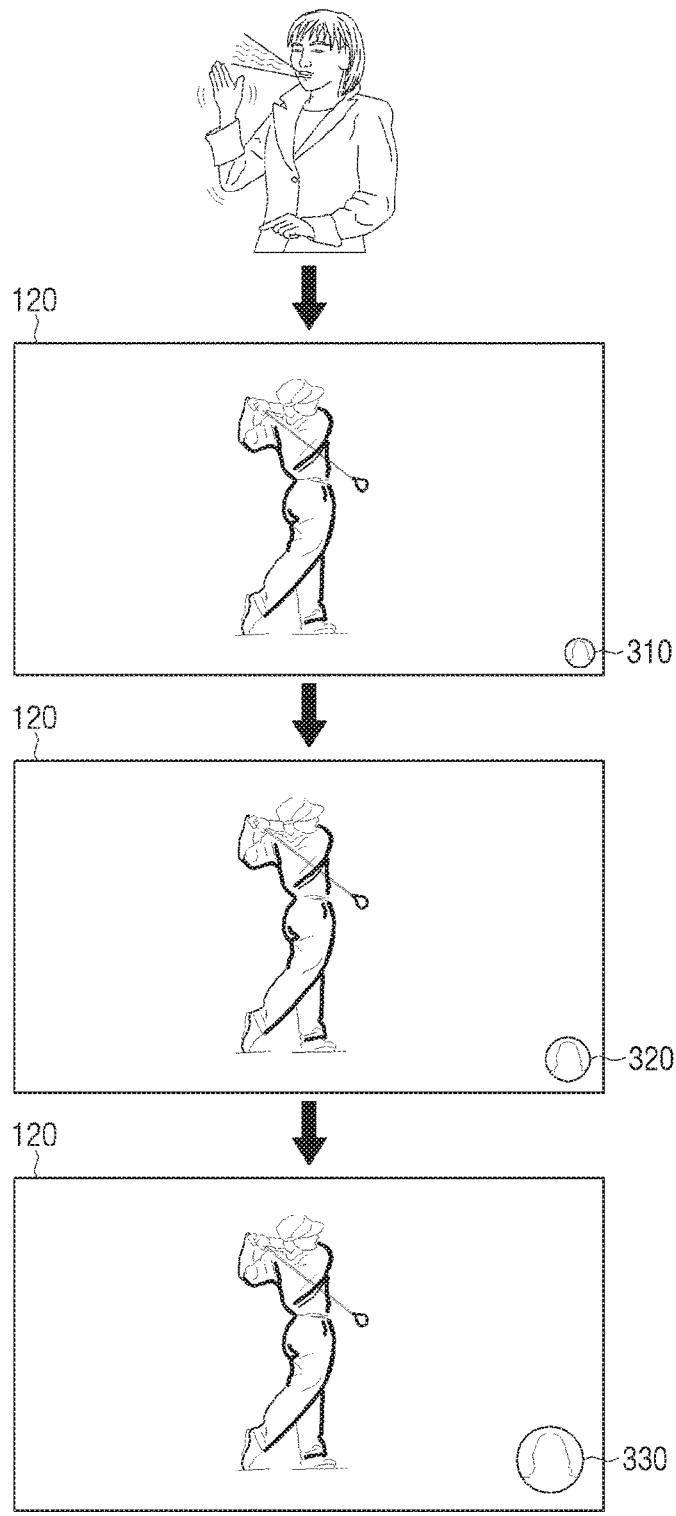
FIG. 3 is a diagram illustrating a method for changing size of a video call UI, according to an exemplary embodiment.

FIG. 3 is a drawing illustrating a method for changing a video call UI according to an exemplary embodiment.

As illustrated in FIG. 3, the processor 130, in response to at least one of a user gesture and voice included in video call data received from the different display apparatus 200 satisfying a preset condition, may control the display 120 to change size of video call UI and display. For example, the processor 130, when user voice included in the received video call data is greater than or equal to preset size, may magnify size of the video call UI.

Here, the processor 130 may extract a gesture and a voice of a user included in video call data received from the different display apparatus 200. For example, the processor 130 may ignore horn or TV sound included in video call data and extract only user voice. The processor 130 may ignore a gesture of another person other than a user from among video included in video call data and extract user gesture only.

Exemplary embodiments are not limiting, and the processor 130 might not extract gesture and voice of a user, and change size of video call UI and display the UI based on at least one of a gesture and sound in video data.

In particular, the processor 130, when at least one of user gesture and voice included in video call data received from the different display apparatus 200 is recognized for more than preset time, may gradually magnify video call UI and display the UI. For example, the processor 130, user voice included in the received video call data is maintained at size more than preset size for more than 10 seconds, size of video call UI can be magnified.

In this case, the processor 130 may ignore silence for a short time during a preset time. For example, the processor 130, when a user voice is recognized for three seconds and is not recognized for one second afterward, if the user voice is recognized again, it can be determined that user voice is continued.

The processor 130 may gradually expand and display the video call UI. For example, the processor 130, while displaying the first video call UI 310, when a preset condition is satisfied, the size of the video call UI can be magnified to the second video call UI 320, and the third video call UI 330. The processor 130 may gradually expand the video call UI and display the UI.

The processor 130 may determine size of the video call UI, based on at least one of gesture and voice of a user included in video call data received from the different display apparatus 200. For example, the processor 130 may determine size of the video call UI based on size of user voice. The processor 130 may determine size of the video call UI based on duration of user voice. The processor 130 may determine size of the video call UI based on at least one of size and resolution of the display 120.

In FIG. 3, it is illustrated that the video call UI is displayed as a round shape on a right lower end, but exemplary embodiments are not limited thereto. For example, the processor 130 may move a position of the video call UI to another area according to a user manipulation and change a shape to rectangular shape.

In addition, the processor 130 may overlay the video call UI on the content shared on a real-time basis and display the UI. The processor 130 may change transparency of the video call UI and display the UI.

The processor 130 may display that the video call UI takes a specific area. For example, the processor 130 may reduce a display area of the content being shared on a real time basis as much as an area where the video call UI is displayed and display the area.

The processor 130 may change size of the video call UI and a shape thereof. For example, the processor 130 may magnify size of the video call UI and change color of an edge of the video call UI or shape of the video call UI.

Figure 4A:
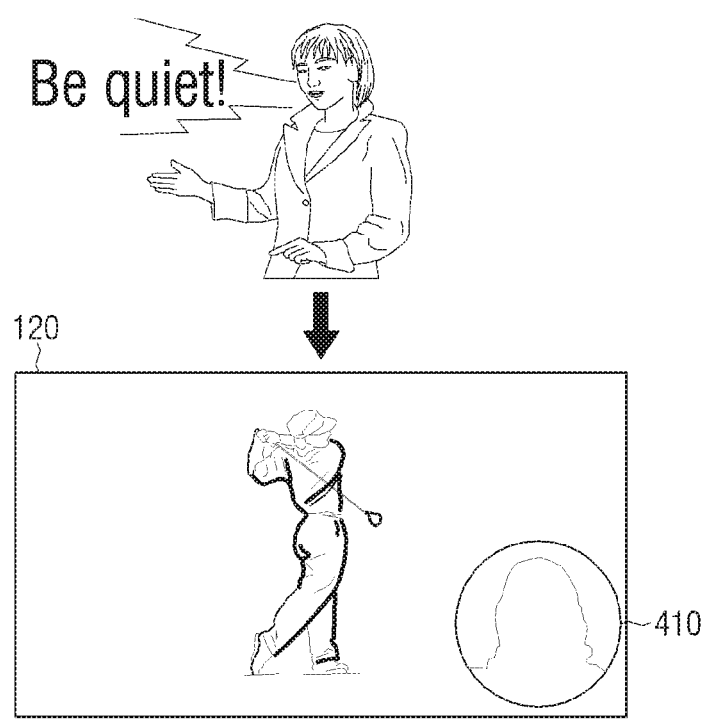
FIGS. 4A to 4C are diagrams illustrating an example of an operation according to a user voice.
Figure 4B:
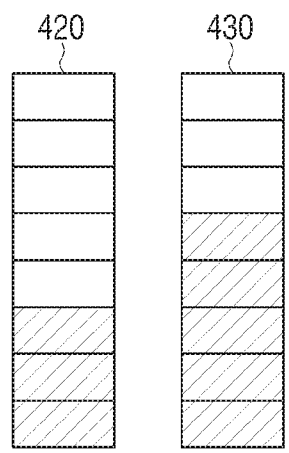
Figure 4C:
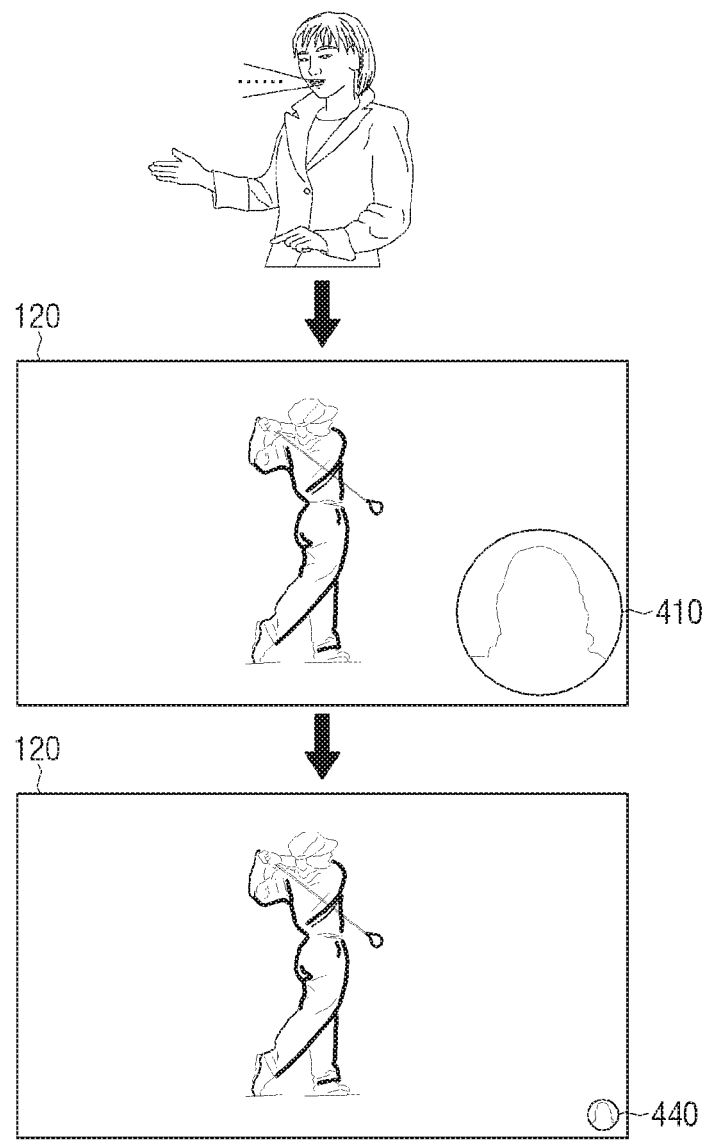

FIGS. 4A to 4C are views to illustrate an example of an operation according to a user voice.

As illustrated in FIG. 4A, the processor 130, when user voice included in the video call data received from the different display apparatus 200 is greater than a preset size, may magnify the video call UI to a preset size and display.

Here, the preset size to which the video call UI is magnified can be determined by a user. The processor 130, based on at least one of size and resolution of the display 120, may determine a preset size to which the video call UI is magnified.

FIG. 4A illustrates an example of the video call UI 410 which is magnified to a preset size, but it is not limited thereto. For example, the processor 130 may display the video call UI on an entire area, or display at a different size and a different shape.

As illustrated in FIG. 4B, the processor 130, when user voice is greater than volume of the content, may magnify the video call UI to a preset size and display. For example, the processor 130, by comparing the sound size 420 which is being shared on a real time basis with size 430 of voice included in the video call data, when size of the voice 430 is greater than size 420 of the sound, may magnify the video call UI to a preset size and display.

Here, the processor 130 may extract a user voice included in video call data and determine size thereof. For example, the processor 130 may ignore a horn sound and a TV sound included in video call data and extract user voice only, and compare it with size of sound of the content.

As illustrated in FIG. 4C, the processor 130, while the video call UI is magnified to a preset size, when user voice is not recognized for preset time, may return the video call UI to a size before being magnified and display. For example, the processor 130, while the video call UI is magnified to a preset size, when a user voice is not recognized, contents which are being shared are determined to be more important display element, and the video call UI can be reduced to the second video call UI 440 to a size immediately before being magnified from the first video call UI 410. The processor 130 may reduce the video call UI to a different size instead of the size immediately before being magnified.

Here, preset time can be set by a user, or can be a time that is set when manufacturing the display apparatus 100.

Figure 5A:
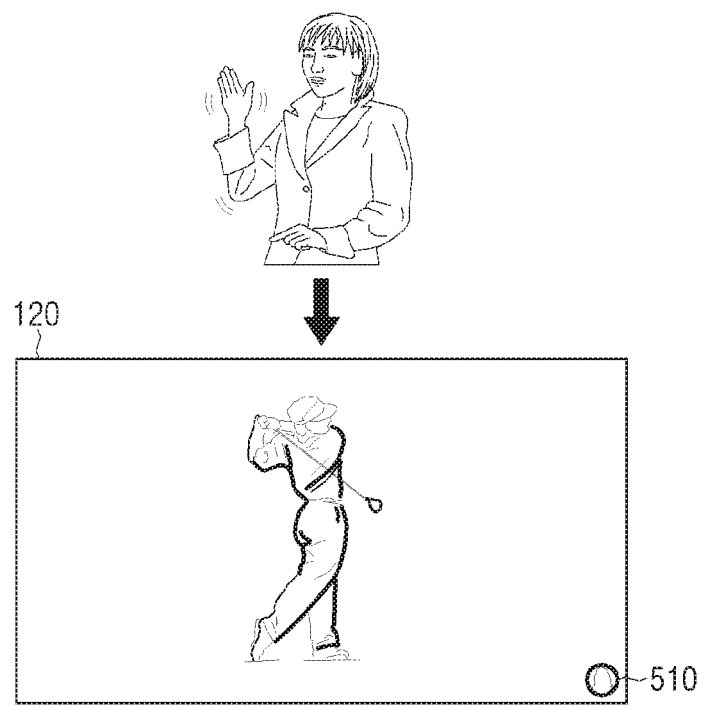
FIGS. 5A and 5B are diagrams illustrating an example of a method for providing a visual feedback to a video call UI.
Figure 5B:
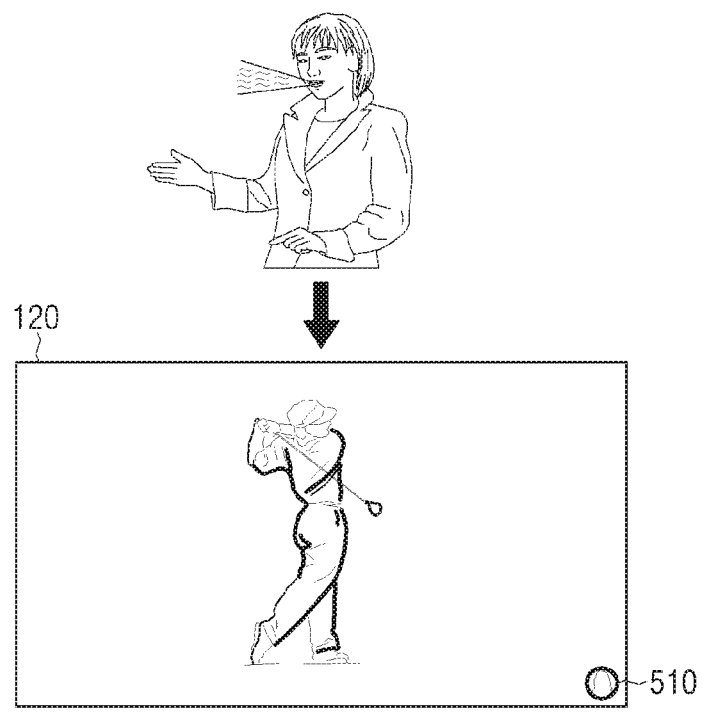

FIGS. 5A and 5B are views illustrating an example of a method for providing visual feedback to the video call UI. The processor 130, when at least one of a user gesture and a voice is recognized from video call data received from the different display apparatus 200, may provide preset visual feedback to edge of the video call UI, and when at least one of the recognized user gesture and voice satisfies a preset condition, may change size of the video call UI and display.

As illustrated in FIG. 5A, the processor 130, when a user gesture and a voice of a user are not recognized, may minimize a size of the video call UI and display. In addition, the processor 130, when user's gesture is recognized, may provide visual feedback to change a color of an edge of the video call UI or flicker. The processor 130 may provide visual feedback to change a color of the edge of the video call UI or flicker the UI. Accordingly, the processor 130 may attract a viewpoint of the user of the display apparatus 100 who views contents which are being shared on a real time basis.

Alternatively, as illustrated in FIG. 5B, the processor 130, when a user gesture and a voice are not recognized, may minimize a size of the video call UI and display the UI. In addition, the processor 130, when the user voice is recognized, may provide visual feedback to change a color of an edge of the video call UI or flicker the UI. The processor 130 may provide visual feedback to change a color of an edge of the video call UI and flicker the UI. Accordingly, the processor 130 may attract a viewpoint of the user of the display apparatus 100 who views contents which are being shared on a real time basis.

The processor 130 may provide visual feedback to the video call UI only when both a user gesture and a voice are recognized.

The processor 130 may provide visual feedback to the video call UI only when a gesture or a voice of a user is preset gesture or voice. For example, the processor 130, when the user voice is a name of a user of the display apparatus 100, may provide visual feedback to the video call UI. The processor 130 may provide visual feedback to the video call UI when a user gazes at a camera provided on the different display apparatus 200.

The processor 130, when at least one of a gesture and a voice of the recognized user satisfies a preset condition, may change a size the video call UI and display the UI. For example, the processor 130, while color of the edge of the video call UI is changed, when the user voice is maintained for more than preset time, may change a size of the video call UI and display the UI.

Figure 6:
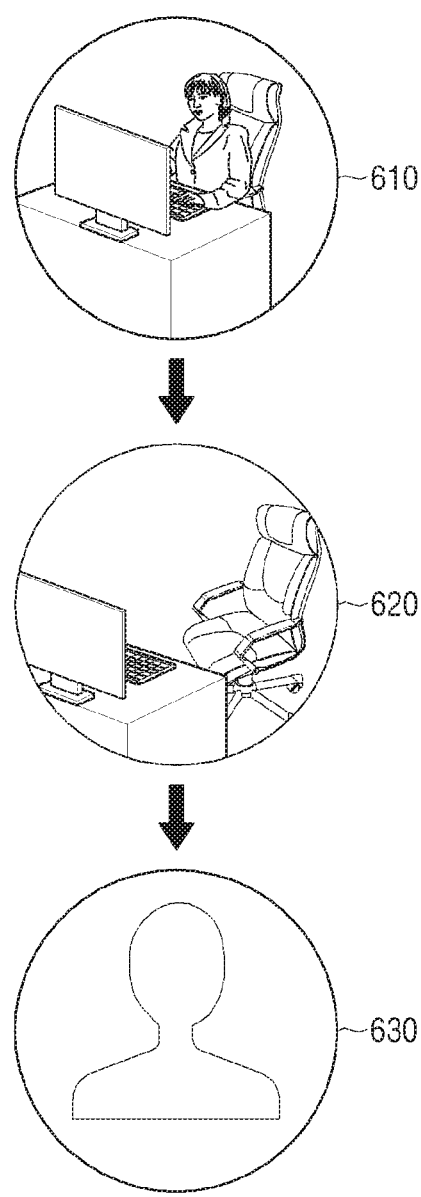
FIG. 6 is a diagram illustrating an operation in a case in which a user is not recognized, according to an exemplary embodiment.

FIG. 6 is a view to illustrate an operation of a case in which a user is not recognized according to an exemplary embodiment.

As illustrated in FIG. 6, the processor 130, when a user video and voice are not recognized from video call data received from the different display apparatus 200, may substitute video call data displayed on the video call UI with a preset image and display.

For example, the processor 130, while a first call UI 610 including a user and nearby devices is being displayed, when a user is out of the view of the camera provided on the different display apparatus 200, for a preset time, a second video call UI 620 including a video captured by the camera provided on the different display apparatus 200 can be displayed. In addition, the processor 130, when preset time elapses, may display a third video call UI 630 including a preset image instead of a video photographed by the camera provided on the different display apparatus 200.

However, exemplary embodiments are not limited thereto, and the processor 130, when a user is out of view of the camera provided on the different display apparatus 200 without elapsing of preset time, may display the third video call UI 630 including a preset image.

The processor 130, based on a preset gesture or a voice of a user instead of a user's video, may display the third video call UI 630 including a preset image. For example, the processor 130 may display the third video call UI 630 including a preset image according a gesture to hold right hand.

The processor 130, when a gesture and a voice of a user are not recognized for more than preset time, may display the third video call UI 630 including a preset image. For example, the processor 130, when a gesture and a voice of a user are not recognized for more than 10 seconds, may display the third video call UI 630 including a preset image.

Here, the preset image may be a basic image provided from a video call application, or an image set by a user. The processor 130 may display an image immediately before being out of an angle of the camera provided on the different display apparatus 200 instead of a preset image.

Figure 7:
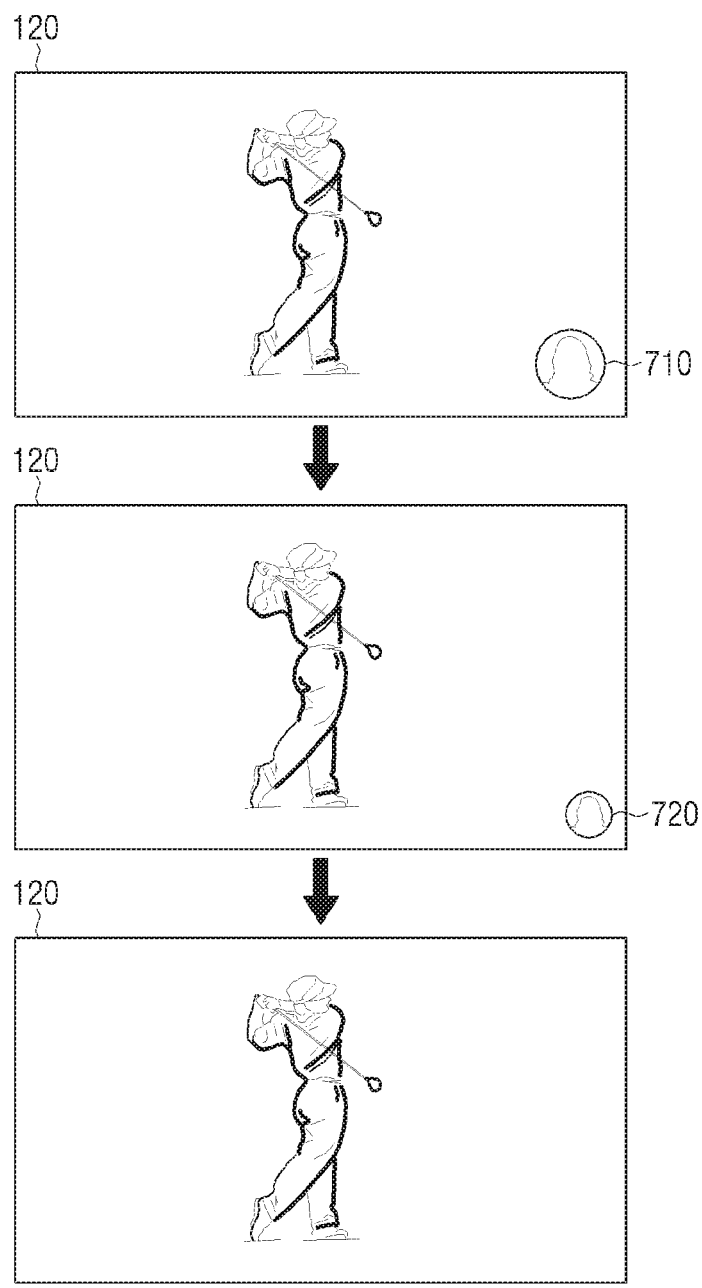
FIG. 7 is a diagram illustrating an operation to reduce a video call UI, according to an exemplary embodiment.

FIG. 7 is a view illustrating an operation to reduce the video call UI according to an exemplary embodiment.

As illustrated in FIG. 7, the processor 130, when at least one of the gesture and the voice of a user included in the video call data received from the different display apparatus 200 is not recognized for more than preset time, may gradually reduce the video call UI 710 and display the reduced video call UI 720.

For example, the processor 130, when a user included in the video call data received from the different display apparatus 200 does not show a large movement and does not speak, may gradually reduce the video call UI and display the reduce video call UI. That is, the processor 130, even when there is a user within an angle of the camera provided on the different display apparatus 200, may gradually reduce the video call UI and display the reduced video UI.

Exemplary embodiments are not limited thereto and the processor 130 may gradually reduce the video call UI.

The processor 130, even when a user is not recognized within an angle of the camera provided on the different display apparatus 200, may gradually reduce the video call UI and display the UI.

As illustrated in FIG. 6, the processor 130, while the video call UI including a preset image is displayed, when a preset time elapses, may gradually reduce the video call UI and display the UI.

The processor 130 may reduce the video call UI and then may not display the video call UI. In this case, the processor 130 may ignore video data included in the video call data received from the different display apparatus 200 and output audio data only. The processor 130 may transmit a signal requesting audio data only to the different display apparatus 200, and receive audio data only from the different display apparatus 200.

The processor 130, while performing a call with a user while the video call UI is not displayed, when a gesture or a voice of a user is recognized, may display the video call UI again. In this case, the processor 130 may receive video data and audio data from the different display apparatus 200.

The processor 130, while performing a call with a user when the video call UI is not displayed, if a user's voice is recognized again, may display the video call UI again. In this case, the processor 130 may receive audio data only from the different display apparatus 200.

The processor 130 may receive from a different display apparatus 200 a signal to display the video call UI, and display the video call UI again. In this case, the different display apparatus 200 may recognize user gesture or voice and transmit a signal to display the video call UI again to the display apparatus 100.

The processor 130, when a user gesture or voice is a preset gesture or voice, may display the video call UI again. For example, the processor 130 may display the video call UI again by recognizing an utterance of a user, such as "video call on."

Figure 8:
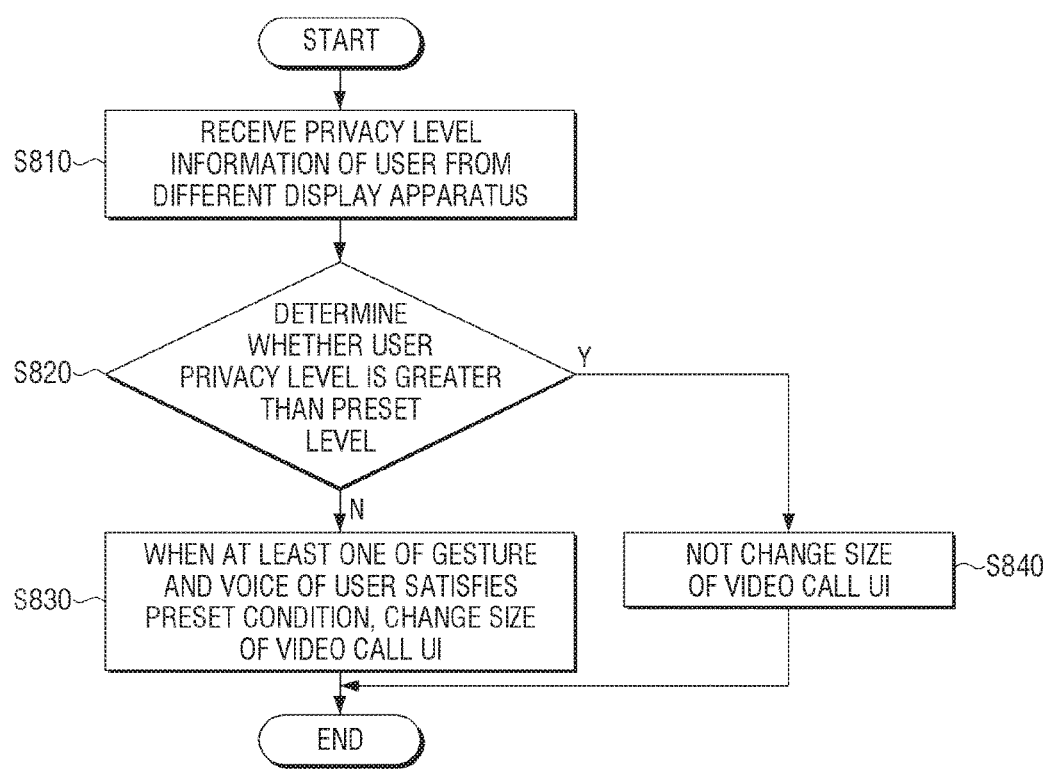
FIG. 8 is a flowchart illustrating an operation according to a privacy level, according to an exemplary embodiment.

FIG. 8 is a flowchart to describe an operation according to privacy level according to an exemplary embodiment.

First, privacy level information is received from the different display apparatus 200, in operation S810. The privacy level information is information set by a user. For example, the privacy level information may be information which is divided into top, middle, and low levels. However, exemplary embodiments are not limited thereto.

The privacy level information may be information to set an operation method for a specific case. For example, the privacy level information, when a user is not recognized, may display a preset image, and when a user is recognized, based on at least one of user gesture and voice, may include information regarding whether or not to change a size of the video call UI.

The processor 130, when the privacy level information is received, may determine whether a privacy level of a user is a preset level or more (S820). The processor 130, when the privacy level of a user is less than a preset level, when at least one of a user gesture and voice satisfies a preset condition, changes a size of the video call UI (S830).

In addition, the processor 130, when the privacy level of a user is greater than a preset level, does not change a size of the video call UI (S840). That is, the processor 130, even when a user gesture or voice is recognized, may not change a size of the video call UI.

FIG. 8 illustrates that whether to change a size of the video call UI may be determined according to user privacy level information, but it is not limited thereto. For example, the processor 130 may determine whether to change color of an edge of the video call UI according to privacy level information of a user.

Figure 9:
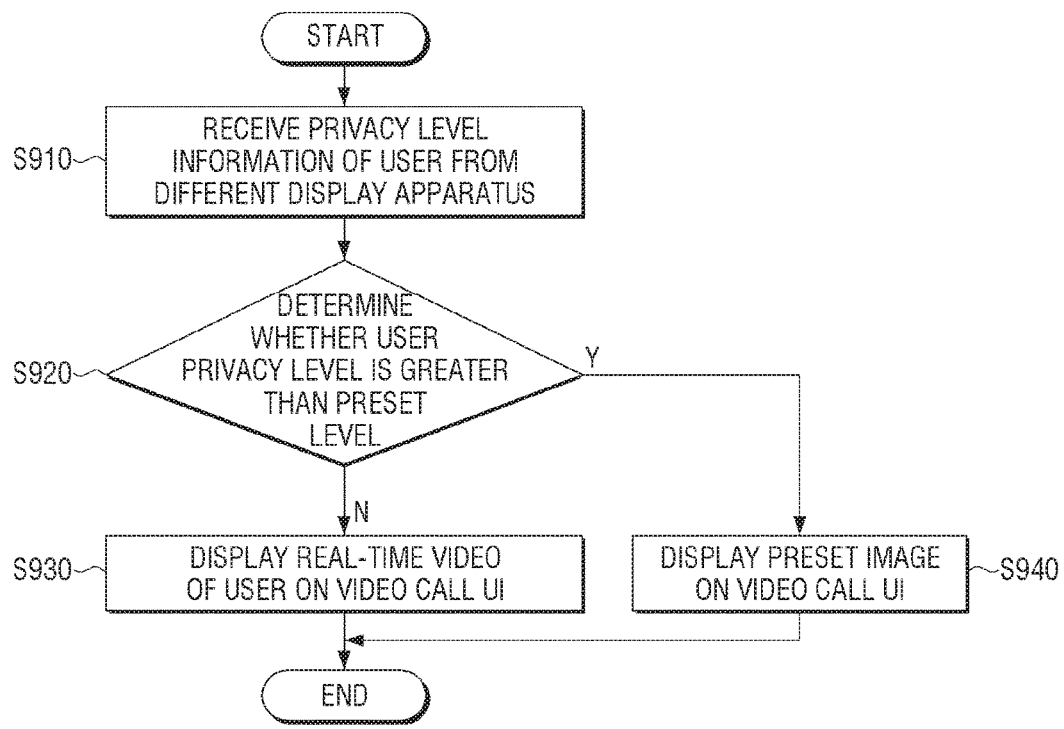
FIG. 9 is a flowchart to describe an operation according to a privacy level, according to another exemplary embodiment of the present disclosure.

FIG. 9 is a flowchart illustrating an operation according to privacy level according to another exemplary embodiment.

Privacy level information of a user is received from the different display apparatus 200 (S910).

The processor 130, when privacy level information is received, determines whether a privacy level of a user is greater than preset level or not (S920). The processor 130, when the privacy level of a user is less than preset level, displays a real time video of a user on the video call UI (S930). That is, the processor 130 may display a video photographed by the camera provided on the different display apparatus 200.

The processor 130, when the privacy level of a user is greater than a preset level, displays a preset image on the video call UI (S940). In this case, the processor 130 may transmit a signal to request audio data only to the different display apparatus 200. The processor 130 may transmit to the different display apparatus 200 a signal requesting a preset image.

FIGS. 8 and 9 illustrate that a size of the video call UI or a display image of the video call UI is determined according to privacy level information. That is, the size of the video call UI and the display image of the video call UI can be determined separately.

For example, the processor 130 may change a size of the video call UI according to privacy level information and display a photographed image on the video call UI, or display a preset image on the video call UI without changing a size of the video call UI. The processor 130, even though a size of the video call UI is changed according to the privacy level information, may display a preset image on the video call UI. The processor 130 may display an image photographed by a user on the video call UI without changing a size of the video call UI.

Figure 10:
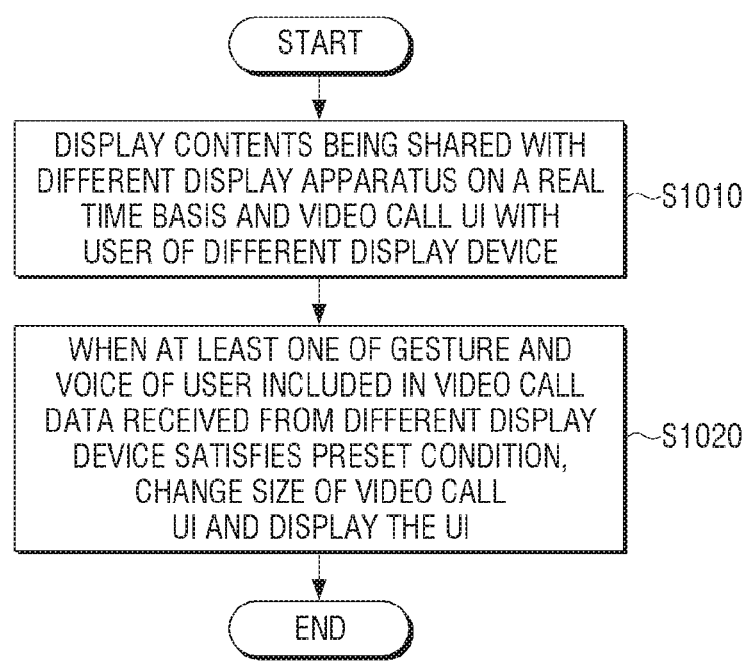
FIG. 10 is a flowchart illustrating a control method of a display apparatus, according to an exemplary embodiment.

FIG. 10 is a flowchart illustrating a method for controlling a display device according to an exemplary embodiment.

In operation S1010, contents which are being shared with a different display device and video call UI with a user of a different display device are displayed. In addition, when at least one of a user gesture and a voice included in the video call data received from a different display device satisfies a preset condition, a size of the video call UI is changed and displayed, in operation S1020.

Here, changing a size the video call UI and displaying the UI, in operation S1020, when at least one of a user gesture and a voice included in video call data received from a different display device is recognized for more than preset time, may gradually expand the video call UI and display the UI.

In addition, changing a size and displaying, in operation S1020, when a user voice included in the video call data received from a different display device is greater than a preset size, may magnify the video call UI to a preset size and display the UI.

In particular, changing a size and displaying, in S1020, when a user voice is greater than volume of contents, may magnify the video call UI and display.

In addition, changing a size and displaying, in S1020, while the video call UI is magnified to a preset size, when a user voice is not recognized for a preset time, may return magnified video call UI to a size immediately before being magnified and display.

Changing a size and displaying, in S1020, when at least one of a user gesture and a voice is recognized from video call data received from a different display device, provide preset visual feedback to an edge of the video call UI, and when at least one of the recognized user gesture and voice satisfies a preset condition, change a size of the video call UI and display.

In addition, changing a size and displaying, in S1020, when user gesture and voice are not recognized from video call data received from a different display device, may replace video call data displayed on the video call UI with a preset image and display.

In addition, changing a size and displaying, in S1020, when at least one of user gesture and voice included in video call data received from a different display device is not recognized for more than a preset time, may gradually reduce the video call UI and display the video call UI.

In addition, changing a size and displaying, in S1020, may receive privacy level information of a user from a different display device, change a size of the video call UI based on the received privacy level information, and display the UI.

Changing a size and displaying, in S1020, when privacy level of a user is less than a preset level, if at least one of user gesture and voice satisfies a preset condition, change a size of the video call UI and display, and when it is greater than a preset level, may not change a size of the video call UI.

According to one or more exemplary embodiments, a display device may change a size of the video call UI according to behavior of a counterparty to the video call and attract attention of a user of the video call.

According to one or more exemplary embodiments, it has been described above that a size of the video call UI is changed based on at least one of a gesture and a voice of a different display device, but it is not limited thereto.

For example, by reflecting interaction with a user of a display device, a size of the video call UI can be changed. In this case, even when at least one of a user gesture and a voice of a different display device satisfies a preset condition, a size of the video call UI may not be changed. The display device, according to at least one of a user gesture and a voice of a different display device, when a user of the display device operates, a size of the video call UI can be changed.

A method for controlling a display device according to one or more exemplary embodiments can be embodied as a program code executable by a processor or a computer and stored in various non-transitory computer readable mediums to be provided to each server or device, so that it is executable by the processor of the server or device.

As an example, a non-transitory computer readable medium can be provided in which a program which sequentially executes the steps of displaying contents being shared with a different display device on a real-time basis and video call UI with a user of a different display device, receiving video call data from a different display device, and when at least one of user gesture and voice included in video call data satisfies a preset condition, changing a size of the video call UI and displaying the video call UI.

The non-transitory computer-recordable medium is an apparatus-readable medium configured to semi-permanently store data. Specifically, the above-described various applications or programs may be stored in a non-transitory apparatus-readable medium such as a compact disc (CD), a digital versatile disc (DVD), a hard disc, a Blu-ray disc, a universal serial bus (USB), a memory card, or a read only memory (ROM), and then may be provided to a user terminal device.

While exemplary embodiments have been shown and described with reference to the drawings, it will be understood by those having ordinary skill in the art that various changes in form and detail may be made therein without departing from the spirit and scope, as defined by the appended claims.

What is claimed is:

1. A display apparatus comprising:
   a communication interface configured to communicate with another display apparatus;
   a display; and
   a processor configured to:
   control the communication interface to receive a content that is shared with the other display apparatus and to receive voice call data including a voice of a user of the other display apparatus,
   control the display to display the content together with a video call user interface (UI) for a video call with the user, and
   control the display to change a display size of a video of the user of the other display apparatus included in the video call UI based on a time at which the voice call data is including an audible voice above a defined level of the user is received.

2. The display apparatus of claim 1, wherein the processor is further configured to, based on a volume level of the voice of the user being greater than a predetermined amount, control the display to enlarge the display size of the video of the user of the other display apparatus included in the video call UI.

3. The display apparatus of claim 1, wherein the processor is further configured to, based on a volume level of the voice of the user being greater than a predetermined amount, control the display to enlarge the display size of the video of the user of the other display apparatus included in the video call UI and reduce a display size of the content.

4. The display apparatus of claim 1, wherein the video call UI and the content are at least partially overlapped.

5. The display apparatus of claim 1, wherein the video call UI and the content are simultaneously displayed in at least some different areas.

6. The display apparatus of claim 1, wherein the processor is further configured to control the display to replace the video of the user of the other display apparatus included in the video call UI with a predetermined image.

7. The display apparatus of claim 1, wherein the processor is further configured to, based on a user gesture included in the video of the user of the other display apparatus included in the video call UI satisfying a predetermined condition, control the display to change the display size of the video of the user of the other display apparatus included in the video call UI.

8. A control method of a display apparatus, the control method comprising:
   receiving a content that is shared with another display apparatus and receiving voice call data including a voice of a user of the other display apparatus;
   displaying the content together with a video call user interface (UI) for a video call with the user of the other display apparatus; and
   changing a display size of a video of the user of the other display apparatus included in the video call UI based on a time at which the voice call data including an audible voice above a defined level of the user is received.

9. The control method of claim 8, wherein the changing comprises, based on a volume level of the voice of the user being greater than a predetermined amount, enlarging the display size of the video of the user of the other display apparatus included in the video call UI.

10. The control method of claim 8, wherein the changing comprises, based on a volume level of the voice of the user being greater than a predetermined amount, enlarging the display size of the video of the user of the other display apparatus included in the video call UI and reducing a display size of the content.

11. The control method of claim 8, wherein the video call UI and the content are at least partially overlapped.

12. The control method of claim 8, wherein the video call UI and the content are simultaneously displayed in at least some different areas.

13. The control method of claim 8, further comprising:
   replacing the video of the user of the other display apparatus included in the video call UI with a predetermined image.

14. The control method of claim 8, wherein the changing comprises, based on a user gesture included in the video the user of the other display apparatus included in the video call UI satisfying a predetermined condition, changing the display size of the video of the user of the other display apparatus included in the video call UI.

15. The display apparatus of claim 1, wherein the processor is further configured to, based on a volume level of the voice of the user being less than a predetermined level for longer than a predetermined time, control the display to remove the video of the user of the other display apparatus included in the video call UI.

16. The control method of claim 8, wherein the changing comprises, based on a volume level of the voice of the user being less than a predetermined level for longer than a predetermined time, removing the video of the user of the other display apparatus included in the video call UI.

17. The display apparatus of claim 1, wherein the processor is further configured to, determine the display size of the video of the user of the other display apparatus included in the video call UI based on a volume level of the voice of the user.

18. The display apparatus of claim 17, wherein the processor is further configured to, based on the volume level of the voice of the user being smaller than a first volume level, control the display to display the video of the user of the other display apparatus included in the video call UI at a first size, based on the volume level of the voice of the user being greater than the first volume level and smaller than a second volume level greater than the first volume level, control the display to display the video of the user of the other display apparatus included in the video call UI at a second size larger than the first size, and based on the volume level of the voice of the user being greater than the second volume level, control the display to display the video of the user of the other display apparatus included in the video call UI at a third size larger than the second size.

19. The display apparatus of claim 2, wherein the processor is further configured to, based on the volume level of the voice of the user being greater than the predetermined amount, control the display to enlarge the display size of the video of the user of the other display apparatus included in the video call UI and reduce a display size of the content.

20. A display apparatus comprising:
a communication interface configured to communicate with another display apparatus;
a display; and
a processor configured to:
control the communication interface to receive a content that is shared with the other display apparatus and to receive voice call data,
perform filtering on the voice call data to remove sound that is not related to a user voice and extract data related to a voice of a user of the other display apparatus,
control the display to display the content together with a video call user interface (UI) for a video call with the user, and
control the display to change a display size of a video of the user of the other display apparatus included in the video call UI based on a time at which the data related to an audible voice above a defined level of the user is received.

* * * * *